(12) United States Patent
Yoneda et al.

(10) Patent No.: US 6,926,299 B2
(45) Date of Patent: Aug. 9, 2005

(54) ELECTRIC STEERING APPARATUS

(75) Inventors: Atsuhiko Yoneda, Wako (JP); Yasuo Shimizu, Wako (JP); Takashi Kuribayashi, Wako (JP); Takashi Miyoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/752,365

(22) Filed: Jan. 5, 2004

(65) Prior Publication Data

US 2004/0211619 A1 Oct. 28, 2004

(30) Foreign Application Priority Data

Apr. 24, 2003 (JP) ........................................ 2003-119653

(51) Int. Cl.⁷ ............................................... B62D 5/04
(52) U.S. Cl. ....................................................... 280/444
(58) Field of Search ................................ 180/443, 444, 180/446

(56) References Cited

U.S. PATENT DOCUMENTS

| | | | |
|---|---|---|---|
| 6,719,089 B2 * | 4/2004 | Yoneda et al. ............... | 180/446 |
| 2002/0166716 A1 | 11/2002 | Shimizu et al. | |
| 2003/0106738 A1 * | 6/2003 | Yoneda et al. ............... | 180/446 |
| 2003/0173920 A1 * | 9/2003 | Tominaga et al. .......... | 318/432 |
| 2004/0065163 A1 * | 4/2004 | Takahashi et al. ...... | 74/388 PS |

* cited by examiner

*Primary Examiner*—Kevin Hurley
(74) *Attorney, Agent, or Firm*—Hamre, Schumann, Mueller & Larson, P.C.

(57) ABSTRACT

An electric steering apparatus includes a brushless motor 3 which applies torque to a steering system through a speed reduction mechanism 4, and a resolver 7 which detects a rotation angle of the output shaft 31 of the brushless motor 3. The resolver 7 is arranged between the brushless motor 3 and the speed reduction mechanism 4 in a manner separately from the body 32 of the brushless motor 3.

4 Claims, 5 Drawing Sheets

ELECTRIC STEERING APPARATUS

BACKGROUND OF THE INVENTION

The present invention relates to an electric steering apparatus which includes an electric motor for applying torque to a steering system through a speed reduction mechanism, and a rotation detector for detecting a rotation angle of the rotational shaft of the electric motor.

Electric power steering apparatus for assisting the driver's steering operation is known as an electric steering apparatus which applies a driving force of the electric motor to the steering shaft through the speed reduction mechanism. As shown in FIG. 4, Japanese Laid-open Patent Application No. 2002-331946 (paragraph numbers 0032 and 0033, FIG. 4) discloses such an electric power steering apparatus with a brushless motor 100.

In this electric power steering apparatus 200 using the brushless motor 100, a drawback in the brushless motor 100, such as voltage drop between brush and commutator due to wear of the brush by repeated use over extended time period, can be overcome, and thus a stable steering assist force is advantageously obtained without a decrease or variation in output of the motor. Further, because the brushless motor 100 is smaller in moment of inertia than the brush motor, excellent steering feeling can be obtained during high-speed straight advance movement of the vehicle or upon turning the steering wheel.

However, such a brushless motor 100 requires an accurate control of electric current supply in accordance with the rotation of the rotational shaft 101 because the brushless motor 100 does not stop the rotation or decrease the rotational speed by the friction between the brush and the commutator. Therefore, in the brushless motor 100, it is necessary to provide a rotation detector 300 for detecting the rotation speed, etc. of the rotational shaft 101, and a current detector (not shown) for detecting electric current flowing through the brushless motor 100, so as to control the brushless motor 100 based on the output signals from these detectors.

However, in this brushless motor 100, if the motor rotation signal from the rotation detector 300 contains a noise, the output of the motor varies and a smooth steering feeling may not be obtained. For example, if the rotation detector 300 is subject to dust, rust due to dew condensation or a deformation by an external force, a noise arises on the motor rotation signal and a smooth steering feeling will be lost. Therefore, the rotation detector 300 is covered by a cover C so that the affect of rust and the like to the rotation detector 300 can be prevented and the motor rotation signal from the rotation detector 300 can be outputted in a stable manner to thereby achieve a smooth steering feeling.

In the conventional electric power steering apparatus, because a separate cover C is provided other than the motor housing 400 for accommodating the brushless motor 100, the manufacturing cost increases accordingly. The rotation detector 300 may be arranged in the motor housing 400 between the bearings 500, 501 which support the rotational shaft 101 of the brushless motor 100 in a manner adjacent to the brushless motor 100. However, with increasing the distance (center distance) between the bearings 500, 501, the rotational shaft 101 has to be extended accordingly. This leads to an increase in size of the brushless motor 100 and a decrease in rigidity of the rotational shaft 101, which is likely to cause vibrations. Increasing the diameter of the rotational shaft 101 to prevent such vibrations makes the weight of the electric power steering apparatus heavier, which decreases the steering feeling. As shown in FIG. 5, relations between vibration, center distance and shaft diameter (size of the shaft) of the rotational shaft 101 are such that more vibration occurs as the center distance becomes greater or as the shaft diameter becomes smaller. On the contrary, less vibration occurs as the center distance becomes smaller or as the shaft diameter becomes greater.

In view of the above, the present invention seeks to provide an electric steering apparatus, which prevents variation of the output from the rotation detector, and without increasing the number of parts which decreases cost while improves steering feeling.

SUMMARY OF THE INVENTION

According to the present invention, an electric steering apparatus includes an electric motor which applies torque to a steering system through a speed reduction mechanism, a controller which controls the electric motor in accordance with an input of a driver, and a rotation detector which detects a rotation angle of a rotational shaft of the electric motor, wherein the rotation detector is arranged between the electric motor and the speed reduction mechanism.

With this construction of the electric steering apparatus, because the rotation detector is arranged between the electric motor and the speed reduction mechanism, it is not necessary to cover the rotation detector positioned outside of the electric motor by a separate cover. This leads to a decrease in cost. Further, because the rotation detector is arranged between the electric motor and the speed reduction mechanism, that is, within the housing for accommodating the electric motor and the speed reduction mechanism, it is free from rust due to dew condensation. Therefore, the motor rotation signal outputted from the rotation detector does not contain any noise, improving the steering feeling.

In the aforementioned electric steering apparatus, the electric motor may be a brushless motor and the rotation detector may be a resolver.

Further, in the aforementioned electric steering apparatus, the rotation detector may be arranged separately from a body of the electric motor.

The term "body of the electric motor" indicates parts except for the rotational shaft of the electric motor. The body of the electric motor is arranged between bearings for rotatably supporting the rotational shaft.

With this construction of the electric steering apparatus, the rotation detector is arranged separately from the body of the electric motor. In other words, the rotation detector is not arranged intermediately of the bearings which support the rotational shaft of the electric motor, so that unlike the conventional arrangement where the rotation detector is arranged between the bearings for the electric motor, the distance between the bearings does not increase. This can prevent an increase in the size of the electric motor as well as an occurrence of vibration due to decreased rigidity of the rotational shaft.

BRIEF DESCRIPTION OF THE DRAWINGS

Preferred embodiment of the present invention will be described below, by way of example only, with reference to the accompanying drawings, in which.

DETAILED DESCRIPTION OF THE INVENTION

With reference to the accompanying drawings, an electric steering apparatus according to the present invention will be described in detail.

Figure 1:
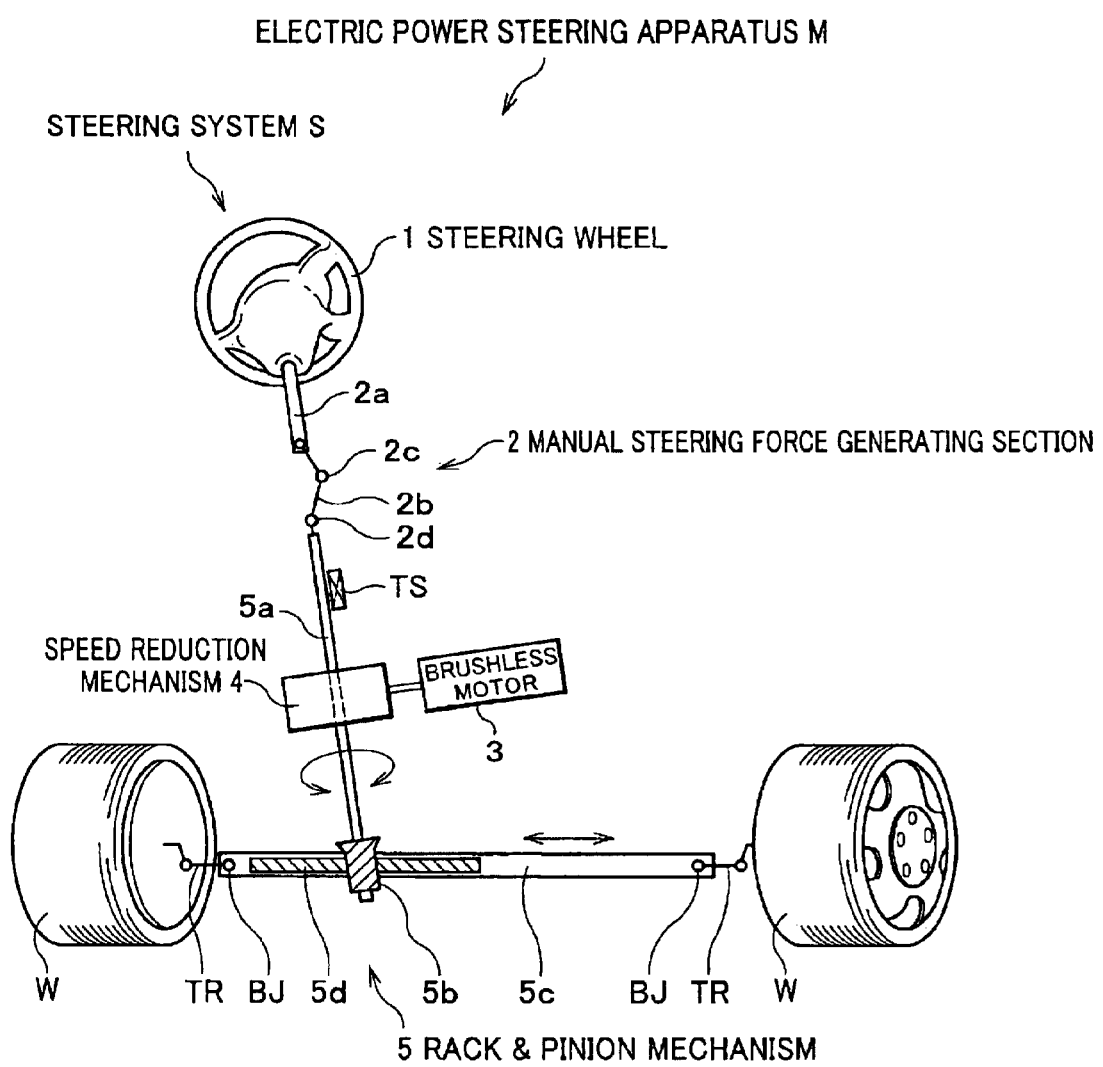
FIG. 1 is a schematic perspective view illustrating an electric power steering apparatus as an electric steering apparatus according to the present invention.

As shown in FIG. 1, an electric power steering apparatus (electric steering apparatus) M is arranged in a steering system S extending from a steering wheel 1 to steerable wheels W, W. The electric power steering apparatus M assists a steering force generated by a manual steering force generating section 2. To be more specific, the electric power steering apparatus M drives a brushless motor (electric motor) 3 to generate assist torque (assist steering force) which is then increased at a speed reduction mechanism 4 with a speed reduction and transmitted to the pinion shaft 5a, so that the manual steering force at the manual steering force generating section 2 can be eased. The electric power steering apparatus M is further provided with a controller (not shown) which controls the brushless motor 3 in accordance with the steering manipulation (input) of the driver, that is, signals from a steering torque sensor TS to be described later and a steering rotation angle sensor (not shown) for detecting the rotation angle of the steering wheel 1.

In the manual steering force generating section 2, the steering shaft 2a that is integral with the steering wheel 1 and the pinion shaft 5a of the rack and pinion mechanism 5 are connected through a connecting shaft 2b. The connecting shaft 2b is provided with a universal joint 2c, 2d at both ends thereof. The rack and pinion mechanism 5 includes a pinion 5b that is provided at the free end of the pinion shaft 5a and meshes with a rack 5d formed on a rack shaft 5c so that a rotational movement of the pinion shaft 5a is converted into a lateral (vehicular width direction) reciprocating movement of the rack shaft 5c. Further, steerable wheels (e.g. right and left front wheels) W, W are connected at both ends of the rack shaft 5c respectively via a ball joint BJ and a tie rod TR.

Figure 2:
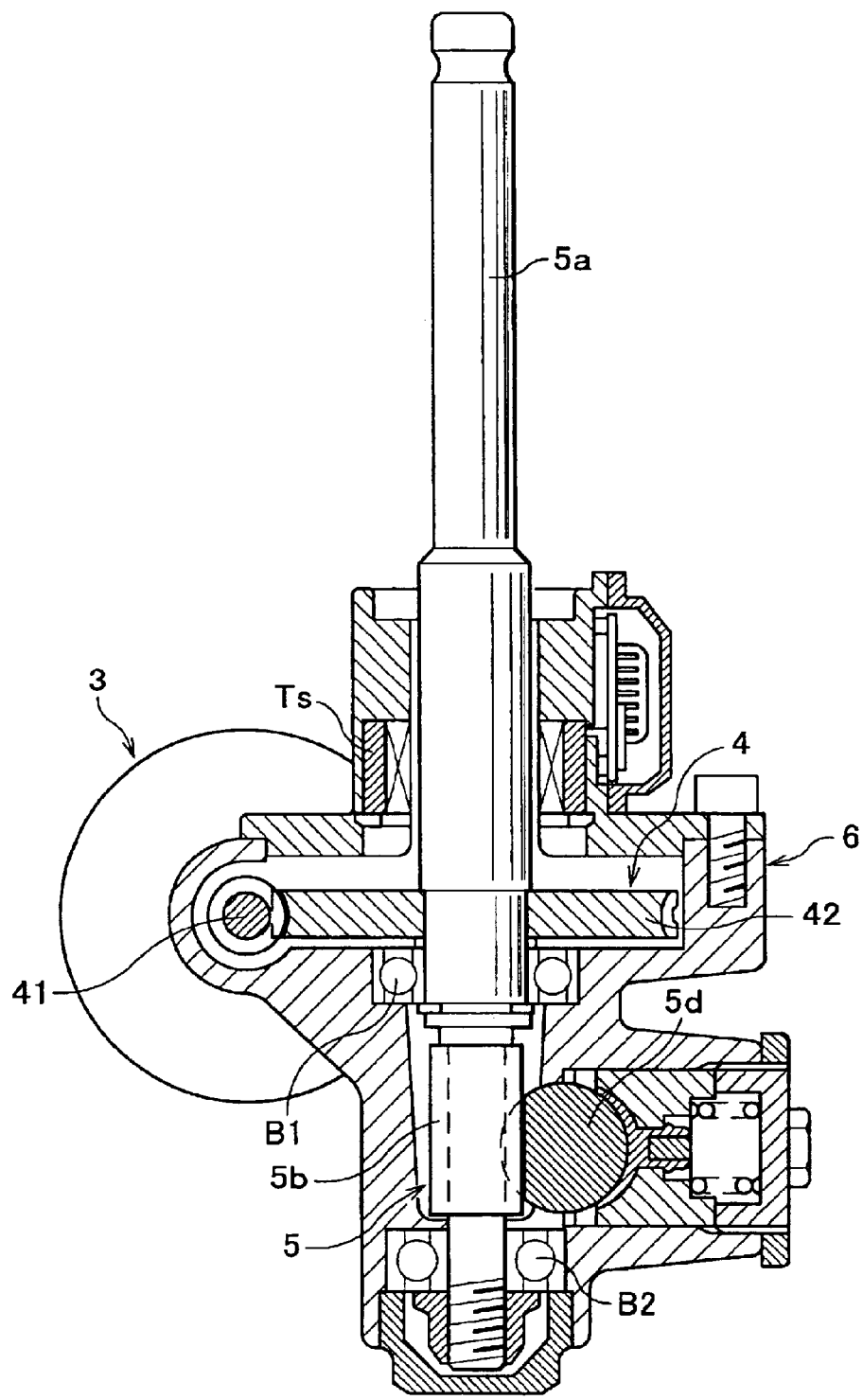
FIG. 2 is a vertical sectional view showing details of the construction in the vicinity of the speed reduction mechanism and the rack and pinion mechanism.

With reference to FIG. 2, the speed reduction mechanism 4 arranged in the proximity of the rack and pinion mechanism 5 will be described in detail.

As shown in FIG. 2, the pinion shaft 5a is rotatably supported by bearings B1, B2 fixed in the gear box 6. Provided in the gear box 6 from the upper side (on the side of the steering wheel 1 shown in FIG. 1) to the lower side are in the order of a steering torque sensor TS, the speed reduction mechanism 4, and the rack and pinion mechanism 5.

The speed reduction mechanism 4 mainly consists of a metallic worm gear 41, and a resinous worm wheel 42 that meshes with the worm gear 41. The worm gear 41 is a gear which rotates around the axis perpendicular to the rotational axis of the worm wheel 42. The worm gear 41 is non-rotatably attached to the rotational shaft of the brushless motor 3 at its end. Also, the worm wheel 42 is non-rotatably attached to the pinion shaft 5a. The brushless motor 3 according to this preferred embodiment is of a three-phase sine wave drive type. However, the present invention is not limited to this specific brushless motor, and other types of brushless motors with different phase number or different drive current system may be employed.

Next, with reference to FIG. 3, the construction in the proximity of the speed reduction mechanism 4 and the brushless motor 3 will be described.

Figure 3:
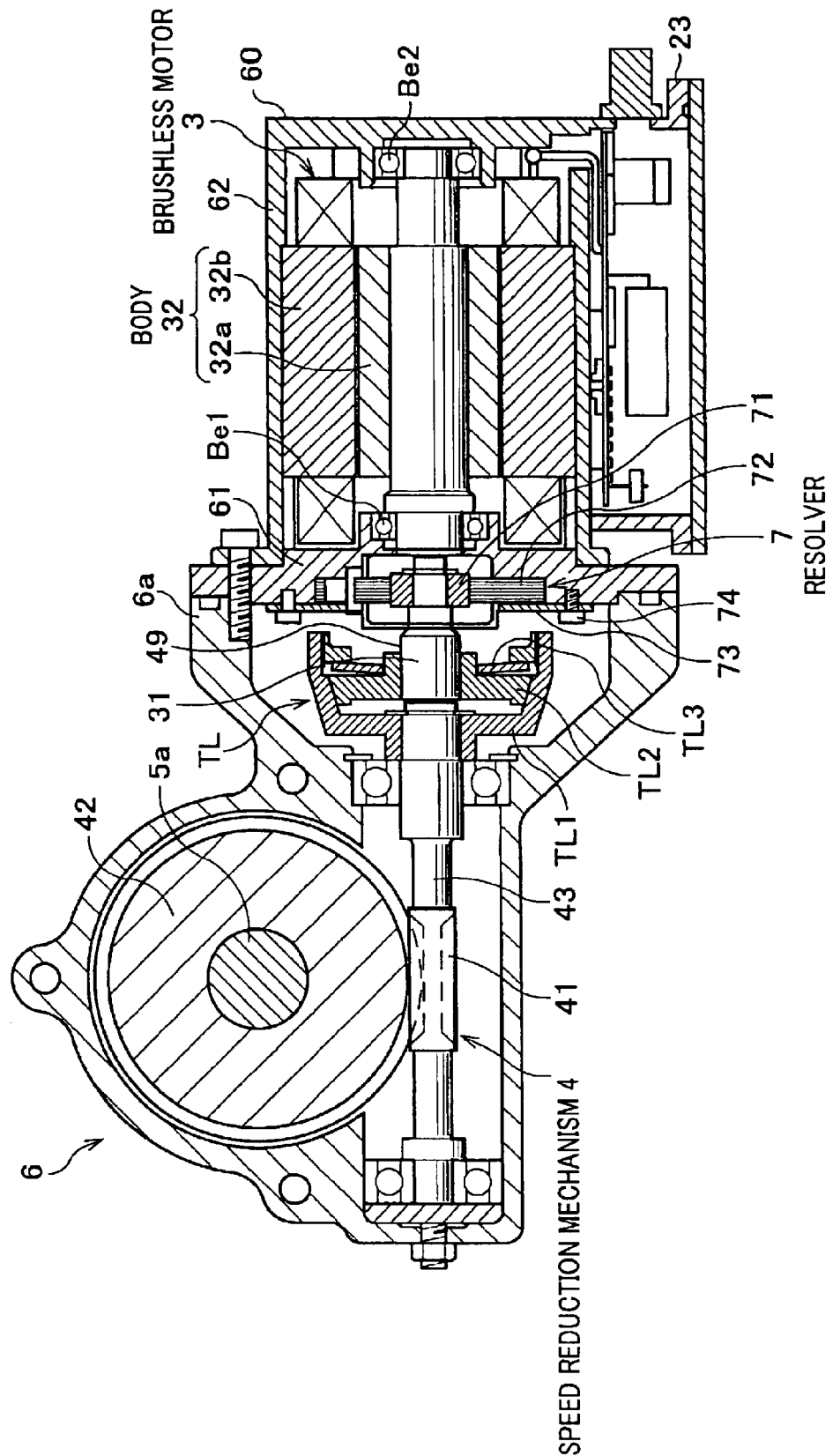
FIG. 3 is a transverse sectional view showing details of the construction in the vicinity of the speed reduction mechanism and the brushless motor of FIG. 2.
Figure 4:
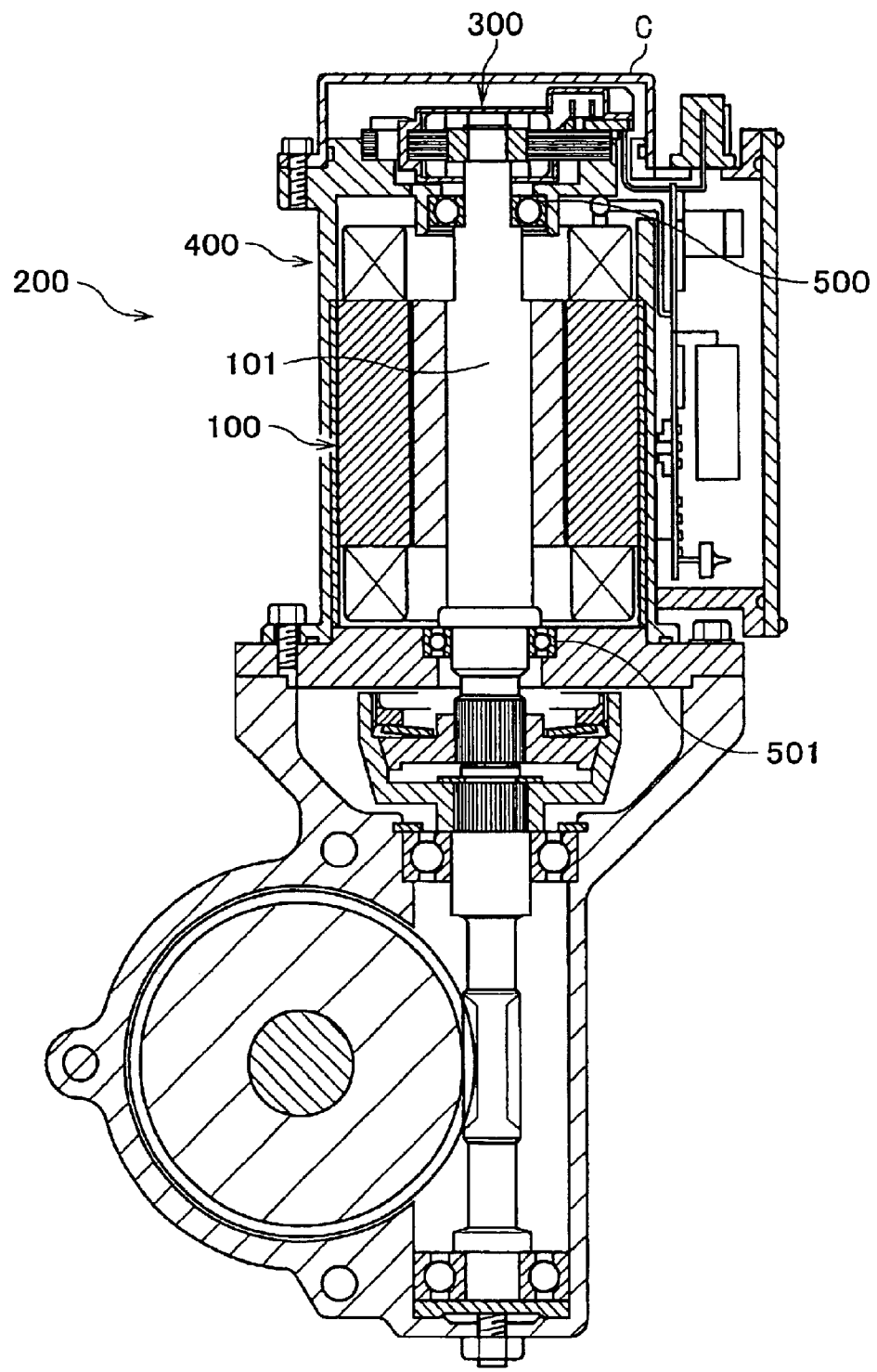
FIG. 4 is a sectional view showing the construction in the vicinity of the brushless motor according to the conventional electric power steering apparatus.
Figure 5:
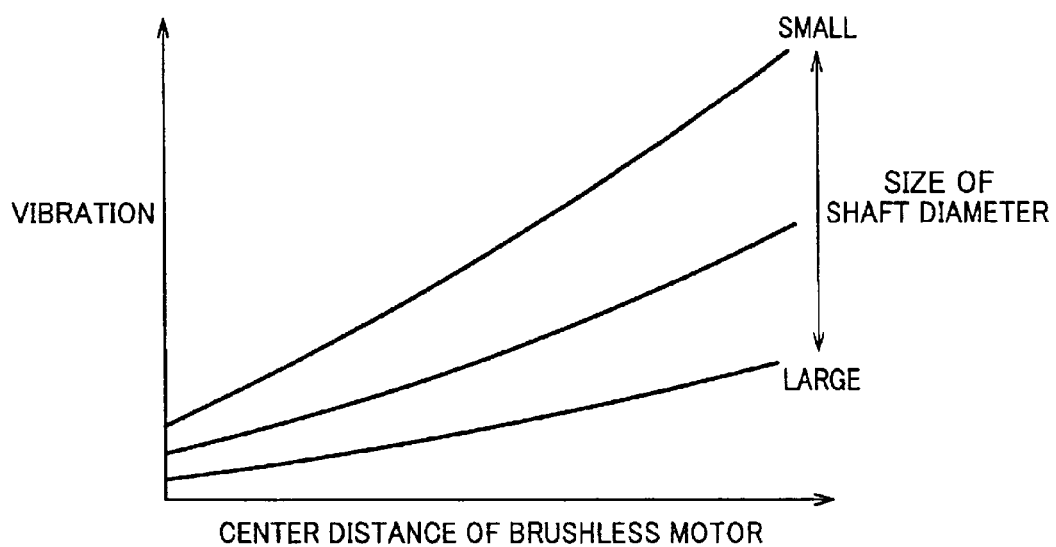
FIG. 5 is a graph showing relations between vibration of the rotational shaft of the motor, center distance, and diameter of the shaft.

As seen in FIG. 3, the gear box 6 includes an extension 6a extending in the direction perpendicular to the axis of the pinion shaft 5a, and first and second motor housings 61, 62 fixed to the end surface of the extension 6a and accommodating the brushless motor 3. Arranged within a space formed by the gear box 6, the extension 6a, and the motor housings 61, 62 are in the order of the speed reduction mechanism 4, a torque limiter TL, a resolver (rotation detector) 7, and the brushless motor 3, from the side of the pinion shaft 5a. In other words, the resolver 7 is arranged between the speed reduction mechanism 4 and the brushless motor 3.

The brushless motor 3 mainly consists of an output shaft (rotational shaft) 31, and a body 32 for rotating the output shaft 31. By bearings Be1, Be2 positioned to sandwich the body 32 of the brushless motor 3, the output shaft 31 is rotatably supported with respect to the motor housing 61, 62. The body 32 mainly consists of an inner rotor 32a having plurality of permanent magnets, and an outer stator 32b including an electromagnet onto which coils are wound around. The outer stator 32b is fixed to the inner peripheral surface of the second motor housing 62 and the inner stator 32a is fixed to the output shaft 31, so that the output shaft 31 is freely rotatable with respect to the second motor housing 62.

The torque limiter TL includes an outer member TL1 non-rotatably fixed to one end of the worm shaft 43, part of which is formed a worm gear 41, and an inner member TL2 that is fixed to the end of the output shaft 31 of the brushless motor 3 in a manner non-rotatable but slidable along its axial direction. The inner member TL2 is urged against the outer member TL1 by a coned disc spring TL3 to transmit the torque. When a torque exceeding a certain value applies to the torque limiter TL, the inner member TL2 and the outermember TL1 slip to each other, thereby restricting the assist torque from the brushless motor 3 and cutting off the excessive torque. Provided on the contact surfaces of the outer member TL1 and the inner member TL2 are serrations for engagement therewith.

The resolver 7 is a sensor for sensing the rotation angle and the rotating direction of the inner rotor 32a that is fixed to the output shaft 31 of the brushless motor 3. The resolver 7 is fixed to an appropriate position of the output shaft 31. To be more specific, the resolver 7 includes a laminated core rotor 71 fixed to an appropriate position of the output shaft 31 (between the torque limiter TL and the first motor housing 61), and a detection element (combination of an exciting coil and a detection coil) 72 for magnetically detecting the rotation angle of the laminated core rotor 71. The detection element 72 is fixed to the first motor housing 61 through a mounting plate 73 and by bolts 74. BY this arrangement of the resolver 7, the first motor housing 61 is interposed between the resolver 7 and the body 32 of the brushless motor 3, and the resolver 7 and the body 32 of the brushless motor 3 are separately spaced apart for a certain distance.

According to the above electric power steering apparatus M, because the resolver 7 is arranged between the brushless motor 3 and the speed reduction mechanism 4, it is not necessary to provide a separate cover unlike the conventional electric power steering apparatus, leading to a decrease in cost. Further, because the resolver 7 is arranged within the gear box 6, it is not affected by rust derived from dew condensation, dust or external force so that the motor rotation signal outputted from the resolver 7 does not contain any noise, thereby improving the steering feeling.

Because the resolver 7 and the body 32 of the brushless motor 3 are separately spaced apart for a certain distance, when compared with the structure where the resolver 7 is arranged between the bearings Be1, Be2 for supporting the brushless motor 3, the electric power steering apparatus M according to the present invention can prevent the brushless motor 3 (second motor housing 62) from increasing the size, and prevent occurrence of vibrations due to decreased rigidity of the output shaft 31 so as to obtain a smooth steering feeling. Further, because the resolver 7 and the body 32 of the brushless motor 3 are spaced apart and the first motor housing 61 is arranged therebetween, a mutual interference between the resolver 7 and the brushless motor 3 can be prevented.

While the present invention has been described in detail with reference to a specific embodiment thereof, it is to be understood that various changes and modifications may be made without departing from the scope of the claims.

In the preferred embodiment, the electric steering apparatus has been explained as an electric power steering apparatus M. However, the present invention is not limited to this specific type and is applicable to a steer by wire type electric steering apparatus. Further, in place of the pinion assist type electric power steering apparatus M, the present invention can be applied to a rack assist type electric power steering apparatus.

Further, in the preferred embodiment, the resolver 7 is arranged between the torque limiter TL and the brushless motor 3. However, the present invention is not limited to this specific arrangement and the resolver 7 may be arranged between the speed reduction mechanism 4 and the torque limiter TL.

What is claimed is:

1. An electric steering apparatus comprising:

a speed reduction mechanism;

an electric motor which applies torque to a steering system through the speed reduction mechanism;

a torque limiter;

a controller which controls the electric motor in accordance with an input of a driver; and a rotation detector which detects a rotation angle of a rotational shaft of the electric motor;

wherein the rotation detector and the torque limiter are arranged between the electric motor and the speed reduction mechanism.

2. An electric steering apparatus according to claim 1, wherein the electric motor in a brushless motor and the rotation detector is a resolver.

3. An electric steering apparatus according to claim 1, wherein the rotation detector is arranged separately from a body of the electric motor.

4. An electric steering apparatus according to claim 2, wherein the rotation detector is arranged separately from a body of the electric motor.

* * * * *